Figures 1, 2:
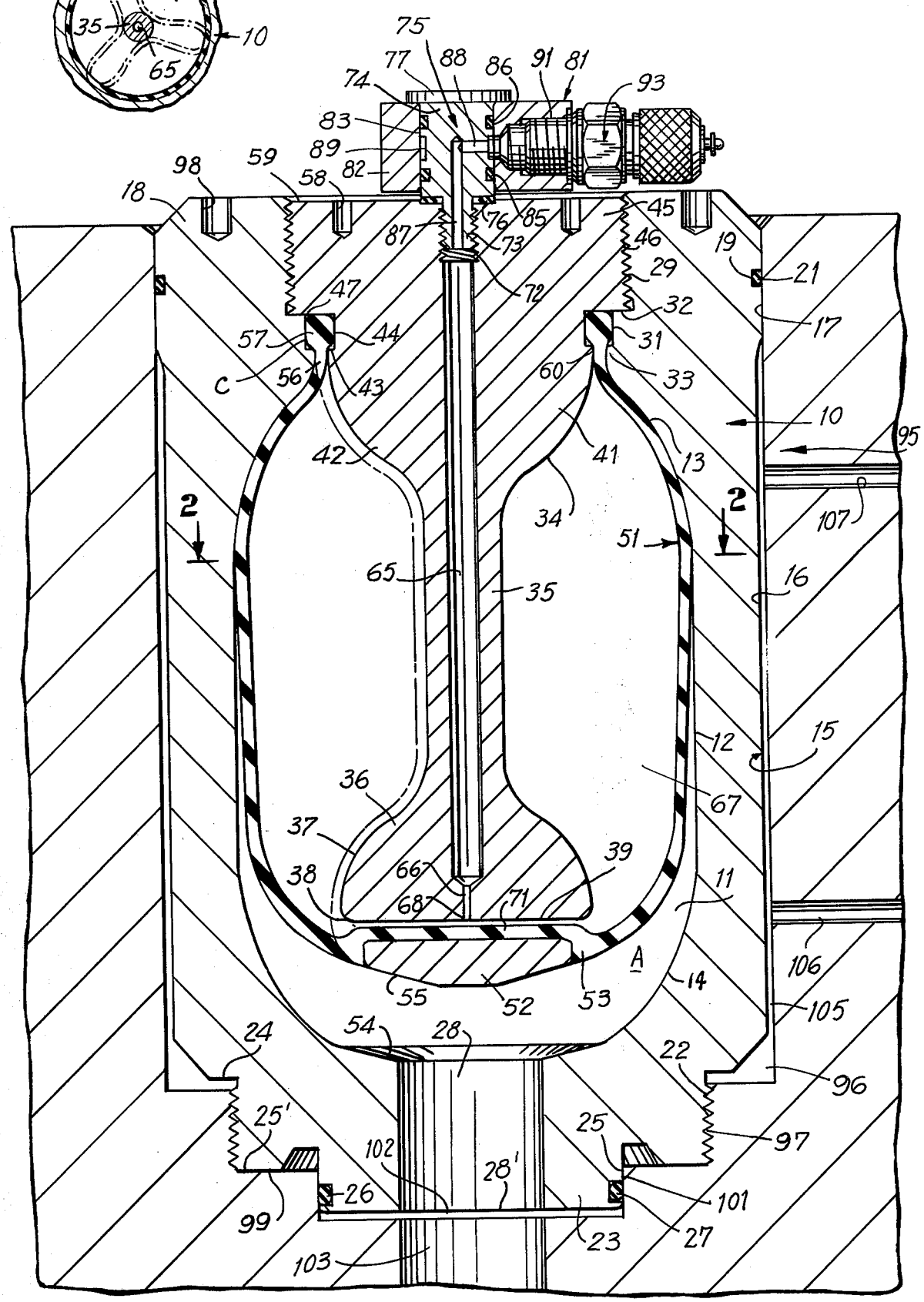

United States Patent [19]
Schön

[11] 3,961,646
[45] June 8, 1976

[54] PRESSURE ACCUMULATOR

[75] Inventor: Otmar Schön, Scheidterberg, Germany

[73] Assignee: Greer Hydraulics, Inc., Los Angeles, Calif.

[22] Filed: Mar. 13, 1975

[21] Appl. No.: 557,876

[30] Foreign Application Priority Data
Oct. 1, 1974   Germany............................ 2446798

[52] U.S. Cl..................................... 138/30; 138/26
[51] Int. Cl.² ......................................... F16L 55/04
[58] Field of Search .............................. 138/26–28, 138/30, 31; 92/164, 89, 43

[56] References Cited
UNITED STATES PATENTS

| | | | |
|---|---|---|---|
| 2,347,379 | 4/1944 | Teeter.................................. | 138/30 |
| 3,433,268 | 3/1969 | Greer................................... | 138/30 |
| 3,674,053 | 7/1972 | Murman et al. ..................... | 138/30 |
| 3,744,527 | 7/1973 | Mercier ............................... | 138/30 |

Primary Examiner—Richard E. Aegerter
Assistant Examiner—Larry Jones
Attorney, Agent, or Firm—Arthur B. Colvin

[57] ABSTRACT

A pressure accumulator having a hollow cylindrical housing which is inserted into the mouth of a cylindrical cavity in the body of a hydraulically operated apparatus or machine. The inner end of the cavity has a threaded recess adapted to receive the correspondingly threaded end of the housing. The interior of the accumulator housing mounts a deformable bladder in which is positioned an axially extending support member in the shape of a dumbell or hour glass, one end of which is screwed into the mouth of the housing and the other end of which is normally spaced from the closed end of the bladder, the latter having an axially mounted valve member adapted to close the axial oil port of the housing which is aligned with a fluid port in the threaded recess into which the end of the housing is screwed. The support member is designed to prevent twisting and folding over of the bladder when it is deformed which would result in cracking of the bladder at the region of the folds and failure thereof.

3 Claims, 2 Drawing Figures

U.S. Patent June 8, 1976 3,961,646

PRESSURE ACCUMULATOR

As conducive to an understanding of the invention, it is noted that where a pressure accumulator is to be used under conditions in which the bladder is precharged with gas under a relatively low pressure as compared to the maximum working pressure of the device and is subsequently charged with oil under high pressure, the bladder will be deformed to such a degree that unless it is internally supported, twisting and sharp folds will occur which will cause rupture of the bladder. In addition, due to the extreme compression of the gas in the bladder, unless the heat engendered is dissipated, failure of the unit may also occur.

It is accordingly among the objects of the invention to provide a pressure accumulator which may readily be fabricated and which will operate with assurance that the bladder therein will be properly supported even when subjected to extreme external pressure so that it will provide for high compression of the gas contained therein, yet without any undue twisting or sharp folds forming in the bladder which could result in rupture thereof and failure of the accumulator.

It is a further object to provide an accumulator of the above type which may readily be mounted in a cavity formed in the apparatus in which it is to be used so as to provide an encompassing chamber that may be charged with a suitable coolant to dissipate the heat engendered as a result of the compression of the gas in the bladder.

According to the invention, these objects are accomplished by the arrangement and combination of elements hereinafter described and particularly recited in the claims.

In the accompanying drawings in which is shown one of various possible embodiments of the several features of the invention;

FIG. 1 is a longitudinal sectional view showing the accumulator installed in the apparatus in which it is to form part of the hydraulic system thereof, and FIG. 2 is a sectional view taken along line 2—2 of FIG. 1 showing the deformed condition of the bladder in broken lines.

Referring now to the drawings, the accumulator comprises a hollow housing 10 of steel or other rigid material capable of withstanding the pressure to which the device will be subjected in use. The interior 11 of housing 10 has a cylindrical central portion 12 and substantially hemispherical end portions 13, 14.

The outer surface 15 of the housing is cylindrical along the major portion of its length as at 16 and is of enlarged diameter as at 17 to define a sealing surface adjacent one end 18 of the housing. The sealing surface 17 has an annular groove 19 in which a sealing ring 21 is positioned. The housing has a threaded reduced outer diameter portion 22 adjacent the other end 23 thereof defining an annular shoulder 24 and a further reduced outer diameter portion 25 defining a second sealing surface which has an annular groove 26 in which an annular seal 27 is positioned, the reduced diameter portion 25 defining an annular shoulder 25'.

The end 23 of the housing is provided with an axial bore 28 which defines the oil port of the accumulator. The end 18 of the housing has an axially threaded bore 29 defining the mouth of the housing, said bore 29 being of reduced diameter at its inner end as at 31 defining an annular shoulder 32, the inner end of bore portion 31 having an inwardly extending annular shoulder or lip 33.

Positioned in the interior of housing 11 and extending axially thereof is a core or support member 34 which is substantially in the form of an hour glass or dumbell. More particularly, the support member 34 has a reduced diameter substantially cylindrical mid-portion 35 and a base portion 36 which is of larger diameter than said mid-portion and which is substantially hemispherical, the side wall 37 of which has a convex curvature from the periphery 38 of the flattened end 39 thereof to the cylindrical mid-portion 35.

The support member 34 also has a mounting portion 41 which is also of larger diameter than said mid-portion 35 and which is substantially hemispherical, the side wall 42 of which has a convex curvature extending from the inner end 43 of an annular recess 44 in said mounting portion 41.

The mounting portion 41 is of enlarged diameter at the outer end thereof, defining an annular mounting flange 45, the periphery of which is threaded as at 46. The inner surface 47 of flange 45 defines an annular shoulder the function of which will be hereinafter described.

Positioned in the interior 11 of housing 10 is a deformable bladder 51 of natural or synthetic rubber or similar material having like characteristics. The bladder has a rigid valve member or valve disc 52 secured to the closed end 53 thereof as by molding, said valve member being axially aligned with the inner end 54 of axial bore 28.

The inner end 54 is beveled and defines a seat for the outer surface 55 of valve member 52.

The end 56 of the bladder remote from the closed end 53 thereof has a relatively large diameter opening or mouth with a thickened annular rim 57.

To assemble the accumulator, the support member 34 is first positioned in the bladder 51 with the annular rim 57 snugly encompassing the mounting portion 41 and positioned in annular recess 44. The support member 34 with the bladder 51 mounted therein is inserted through the mouth 29 and then rotated as by means of a spanner wrench (not shown) coacting with recesses 58 in the outer surface 59 of mounting portion 41. As a result, the threaded flange portion 45 will move into the threaded mouth 29 until the shoulder 47 of the flange 45 abuts against annular shoulder 32.

In such position of the flange 45 of the support member 34, the reduced diameter portion 31 will be aligned with the recess 44 to define an annular cavity C closed at its opposed sides and top and having an opening 60 at its bottom. The thickened rim 57 of the bladder 51 will thus be securely retained in the annular cavity C and the wall portion of the bladder will extend from the opening 60.

It is to be noted that the support member 34 has an axial bore 65 extending therethrough which may be of reduced diameter as at 66 at the inner end thereof. This bore is the means by which gas under pressure may be charged into the chamber 67 defined by the interior of the bladder 51. The port 68 defined at the extremity of bore portion 66 may be closed by abutment thereagainst of the layer 71 of bladder material axially aligned with valve member 52.

The outer end of bore 65 is threaded as at 72 and receives the correspondingly threaded stem 73 depending from the cylindrical head 74 of a mounting pin 75, an annular sealing member 76 encompassing the root end of stem 72 to define a seal when the pin 75 is tightened as by a wrench applied to the outer end 77 thereof.

The head 74 of pin 75 rotatably mounts a valve assembly 81 which has a body portion 82 with a bore 83 through which the head 74 extends. The head 74 has a pair of spaced annular grooves 85 in each of which a sealing member 86 is positioned to define a rotary seal.

The pin 75 has an axial bore 87, leading into a radial bore 88 in communication with an annular groove 89 in head 74. The body portion 82 has a second bore 91 extending at right angles to bore 83 and which is in communication at its inner end with annular groove 89. The outer end of bore 91 is adapted to receive a conventional gas charging valve 93.

The accumulator, above described, may be utilized as an integrated part of a machine by being inserted into a preformed cavity therein.

More particularly, as shown, the machine 95 has a cylindrical cavity 96 of diameter just slightly larger than the diameter of sealing surface 17 so that when the accumulator housing is positioned in the cavity 96, the sealing member 21 will be compressed to provide a seal.

The cavity 96 has a first reduced diameter portion 97 which is internally threaded to receive the correspondingly threaded portion 22 of housing 10 which is screwed therein by means of a spanner wrench (not shown) applied to recesses 98 in the outer end 18 of the housing 10.

The inward movement of the housing 10 is limited by the abutment of the shoulder 25' against shoulder 99 defined by a second reduced diameter portion 101 formed in cavity 96, the sealing member 26 pressing snugly against the wall surface of reduced diameter portion 101 to define a seal.

The outer end 28' of bore 28 of housing 10 which defines an oil port is in communication with the adjacent end 102 of a bore or passageway 103 in the body of the machine 95, the passageway being in communication with the hydraulic system of the machine including the source of oil under pressure.

The annular changer 105 defined between the wall of cavity 96 and the housing 10 may be charged with a suitable coolant through passageway 106, a vent passageway 107 also being provided.

In operation of the pressure accumulator, after it is assembled, as above described, the bladder 51 is first precharged with gas to a predetermined pressure, which illustratively may be 150 atmospheres or 2250 psi. Due to the fact that the valve body 82 may rotate 360°, the charging of the bladder through valve 93 may be performed in substantially any position of the machine.

As a result of the charging of the bladder 51 with gas under pressure, the bladder will expand, pressing against the wall surface of the interior of the housing and the valve member 52 will move against seat 54, thereby preventing extrusion of the bladder into bore 28.

A source of oil under pressure greater than that in the bladder, is then forced through aligned bores 103, 28 to force the valve member 52 off its seat so that such oil may enter the oil chamber a defined between the wall surface of the interior of the housing 10 and the bladder and charge such chamber while at the same time further compressing the gas in the bladder 51.

The accumulator above described is designed to operate between a large pressure range, for example, the maximum operating pressure may be 1,200 atmospheres or 18,000 psi. Thus, the pressure differential between precharge (2,250 psi) and maximum operating pressure (18,000 psi) would be 15,750 psi or 8 to 1, as contrasted with the usual ratio of 3 or 4 to 1 normally employed in pressure accumulators.

Due to such extreme compression of the gas, the heat generated is high and the effects of such heating are minimized by the coolant in annular chamber 105.

Furthermore, due to the extreme deformation of the bladder, as a result of the large pressure ratio, if no precautions were taken, twisting of the bladder and sharp folds could occur which would cause rupture and failure of the device. This, however, is precluded by the provision of the inner support member. Thus, the dimensions of the bladder and the shape and size of the wall surface of the interior of the housing and the support member 34 are such that when the bladder is deformed, it will move inwardly from its expanded position toward the support member. The extremities of the bladder will first engage the rounded enlarged end portions of the support member without any sharp folds forming and when the bladder fully engages the support member there will also be no sharp folds, and twisting of the bladder will be substantially precluded. The gas compressed under high pressure will be retained substantially between the central portion 35 of the support member and the bladder.

It is apparent therefore, that even with such high pressure differential, the bladder will move substantially between its two limits of expansion and contraction without undue twisting thereof and without any sharp folds forming therein which would lead to rupture of the bladder and failure of the unit.

Having thus described my invention, what I claim as new and desire to secure by Letters Patent of the United States is:

1. A pressure accumulator comprising an elongated rigid hollow housing, the interior wall surface of which has a cylindrical central portion and two substantially hemispherical end portions, said housing having an axial bore at one end along its longitudinal axis, defining an oil port extending into the interior thereof through one of said hemispherical end portions, the other end of the housing having an enlarged diameter axial bore, the outer end of said bore defining the mouth of the housing, an elongated support member having an axial bore therethrough and having a central cylindrical portion and two end portions each being substantially hemispherical and formed about a point lying toward the interior center of the housing, means to retain said support member in fixed position in said housing extending axially thereof, one of said end portions being longitudinally spaced from said oil port, a deformable bladder in said housing extending axially thereof, said bladder having one end closed and having a mouth at its other end, said bladder encompassing said support member, means to retain the mouth end of the bladder in fixed position, the outer end of said axial bore in said support member being threaded, a pin having a threaded stem screwed into said threaded outer end, said pin having a protruding head, a block having a bore into which said head extends for rotary mount of the block, said pin having an axial passageway through the stem thereof and a transverse passageway leading into said axial passageway, said block having a transverse bore in communication with said transverse passageway and a valve member in said transverse bore for connection to a source of gas under pressure to charge said bladder with gas under pressure, said bladder being movable between an outward expanded condition in which it engages the wall surface of the interior of said housing and an inward deformed condition in which at least a portion of the bladder engages said support member, the dimensions and configuration of said bladder and the interior of said housing and the support member being such that the bladder will move from its outward to its inward condition without the formation of sharp folds therein.

2. The combination set forth in claim 1 in which means are provided to afford a rotary seal between the head of said pin and the wall surface of the bore in said block.

3. A pressure accumulator comprising an elongated rigid hollow housing, the interior wall surface of which has a cylindrical central portion and two substantially hemispherical end portions, said housing having an axial bore at one end along its longitudinal axis defining an oil port extending into the interior thereof through one of said hemispherical end portions, the other end of the housing having an enlarged diameter axial bore, the outer end of said bore defining the mouth of the housing, an elongated support member having an axial bore therethrough and having a central cylindrical portion and two end portions each being substantially hemispherical and formed about a point lying toward the interior center of the housing, means to retain said support member in fixed position in said housing extending axially thereof, one of said end portions being longitudinally spaced from said oil port, a deformable bladder in said housing extending axially thereof, said bladder having one end closed and having a mouth at its other end, said bladder encompassing said support member, means to retain the mouth end of the bladder in fixed position and means to charge said bladder with gas under pressure, said bladder being movable between an outward expanded condition in which it engages the wall surface of the interior of said housing and an inward deformed condition in which at least a portion of the bladder engages said support member, the dimensions and configuration of said bladder and the interior of said housing and the support member being such that the bladder will move from its outward to its inward condition without the formation of sharp folds therein, said elongated housing having a substantially cylindrical outer surface having an enlarged diameter portion defining an annular sealing surface at the end thereof adjacent the mouth of said housing, said housing having a first and second reduced diameter portion at the other end thereof defining an annular shoulder therebetween, said first reduced diameter portion being externally threaded and said second reduced diameter portion defining an annular sealing surface, each of said annular sealing surfaces having an annular groove therein, and an annular sealing member positioned in each of said annular grooves and a substantially cylindrical cavity having a mouth at one end into which the housing is inserted, said cavity having a diameter substantially equal to that of the first annular sealing surface so that when the latter is aligned with the wall of the cavity it will fit therein with said sealing member defining a seal, said cavity having a first and second reduced diameter portion at its inner end, defining an annular sealing shoulder therebetween for the annular shoulder of said housing, said first reduced diameter portion being threaded to receive the threaded end of said housing, said second reduced diameter portion being of diameter substantially equal to that of the second annular sealing surface so that when the latter is aligned with said second reduced diameter portion, said second sealing member will form a seal, said cavity having a floor at its inner end with an axial passageway leading thereinto.

* * * * *